United States Patent [19]

Schneider et al.

[11] 4,175,443

[45] Nov. 27, 1979

[54] WET-WET DIFFERENTIAL PRESSURE TRANSDUCER

[75] Inventors: John C. Schneider; S. Eugene Hanson; Bruce W. DuVall, all of Colorado Springs, Colo.

[73] Assignee: Kaman Sciences Corporation, Colorado Springs, Colo.

[21] Appl. No.: 909,666

[22] Filed: May 25, 1978

[51] Int. Cl.² ............................................. G01L 9/10
[52] U.S. Cl. ................................... 73/722; 336/30
[58] Field of Search .................... 73/722, 729, 728; 338/41; 336/30; 361/283

[56] References Cited

U.S. PATENT DOCUMENTS

| | | | |
|---|---|---|---|
| 2,079,069 | 5/1937 | Johnson | 73/729 |
| 2,087,494 | 7/1937 | Annin | 73/729 |
| 2,477,233 | 7/1949 | Bristol | 73/729 |
| 2,866,339 | 12/1958 | Rhodes et al. | 73/729 |
| 3,461,726 | 8/1969 | Ziegler | 73/722 |

*Primary Examiner*—Donald O. Woodiel
*Attorney, Agent, or Firm*—Max L. Wymore

[57] ABSTRACT

A three bellows transducer having two absolute bellows of equivalent configuration that isolate the motion detecting coils from the pressure media and respond only to change in line pressure to provide a zero shift and a large differential bellows that responds to a pressure differential to provide an electrical output which is a function of such pressure differential.

12 Claims, 7 Drawing Figures

WET-WET DIFFERENTIAL PRESSURE TRANSDUCER

FIELD OF INVENTION

This invention relates to the field of differential pressure transducers.

PRIOR ART

High temperature environments in energy conversion processes are often the desired locations for a variety of measurements. Improvements in the making of such measurements have been made by the use of eddy current technology but there are still some areas of measurement that are quite difficult particularly where differential pressure measurements are required in high temperature corrosive surroundings.

Making static measurements in high temperature environments is typically accomplished by extending the medium to a less severe environment where more conventional measuring instruments can be used. The extension of the media adds mass to the measurement process and tends to decrease the frequency response of the system. As an example, the piping of a high temperature fluid or gas to a lower temperature adds mass of the fluid or gas within the pipe to any mass, such as a diaphragm or bellows, whose displacement is measured as an indication of pressure. The resonant response of the pipe fluid system thus reduces the system response usually to the point of essentially being a static measurement. Other problems may arise such as the freezing and/or boiling of a fluid within the stand-off pipe.

Real time measurement of rapid phenomena requires rapid response sensors to be placed as near as practical to the source of that being measured. Turbine pressure instability and shaft gyration, pressure chamber or pipe vibration, heat exchanger cavitation, and pressure boundry failure phenomena are but a few examples of where a displacement, flow, pressure temperature or level measurement or the true rate of change of these functions are needed to provide valuable information as to the source of undesirable phenomena.

Eddy current technology provides the basis of several types of known high frequency transducers that operate at temperature extremes as well as at normal temperatures. Examples of such technology are set forth in U.S. Pat. Nos. 3,238,479 and 3,484,678 as depicted in FIG. 1. Common to this technology is one or more coils being used to generate or detect a changing magnetic field. A metallic conductor is placed within the magnetic field of a coil to modify the magnetic flux thereof and also modifies the impedance. The amount of modification will depend on the geometry and separation distance of the coil-conductor combination. The impedance modification is a result of the generation and decay of eddy currents within the conductor.

The impedance of the coil, in the absence of any other conductor is given by:

$$Z_c = R_c + j\omega L_c \quad (1)$$

where $R_c$ and $L_c$ are the resistance and inductance of the coil respectively and $\omega$ is the angular frequency. Capacitance is assumed to be negligible. As the conductor is introduced in proximity to the magnetic field of the coil, the coil impedance is modified such that the effective impedance is now:

$$Z_{eff} = R_{eff} + j\omega L_{eff} \quad (2)$$

where $R_{eff}$ and $L_{eff}$ are now effective values of resistance and inductance. These effective values can be expressed as the original coil values plus a modifier:

$$R_{eff} = R_c + R_m \quad (3)$$

$$L_{eff} = L_c + L_m \quad (4)$$

The modifier values are both functions of geometry G, distance x, frequency $\omega$, resistivity $\rho$, permeability $\mu$, and each other:

$$R_m = R_m(G, x, \omega, \rho, \mu, L_m) \quad (5)$$

$$L_m = L_m(G, x, \omega, \rho, \mu, R_m) \quad (6)$$

As the impedances of Equations 1 and 2 are complex quantities, the difference between the effective coil impedance and the original coil impedance is also complex except for unique values $L_c$ and $L_{eff}$. Thus, the coil has an amplitude change as the proximity between the coil and adjacent conducting material is altered. Detecting these changes will provide a measure of the distance of the coil to the conductor and permit distances as small as $10^{-7}$ meter or 0.1 micron to be resolved.

The use of eddy current techniques or other techniques for the measure of small differential pressures between large pressures is very difficult with existing equipment. One problem is inaccuracy. Where a 20.0 psi absolute pressure is measured with a ±2% accuracy and another pressure of 20.2 psi is measured with a ±2% accuracy, the difference between the two pressures is only 0.2 psi, but the inaccuracy could be as much as 1.0 psi. Further, a deflection element such as a diaphragm or bellows having a spring constant permitting resolution of such small pressure differentials will not be able to withstand the full absolute pressure. Some designs of differential pressure transducers utilize a fluid between two diaphragms such that the common fluid compression supports both diaphragms since both are subjected to high absolute pressures and the fluidity permits both diaphragms to deflect in response to a small difference between the two pressures. This requires the use of a non-conductive incompressible fluid and none is available for this support function at high temperatures encountered.

If the pressure medium is permissible on both sides of a single diaphragm without interfering with the measurement scheme, then differential pressure can be measured provided the pressures are applied in a manner that the pressure difference is insufficient to yield the diaphragm. This application is described in Schweikhard, W. G., and Montoya, E. J., "Research Instrumentation Requirements for Flight Wind-Tunnel Tests of YF-12 Propulsion System and Related Flight Experience", Instrumentation For Airbreathing Propulsion, Fuhs and Kingery, Ed., Progress in Astronautics and Aeronautics, Vol. 34, MIT Press, Cambridge, Massachusetts, and London, England, 1974, pp. 19-39 and in Smith, R. H. and Burcham, F. W., Jr., "Instrumentation for In-Flight Determination of Steady-State and Dynamic Inlet Performance in Supersonic Aircraft, Instrumentation for Airbreathing Propulsion", Fuhs and Kingery, Ed., Progress in Astronautics and Aeronautics, Vol. 34, MIT Press, Cambridge, Massachusetts, and London, England, 1974, pp. 41-58. In the above instances, the accuracy and overpressure problem are solved through the use of a reference pressure tank with high temperature differential pressure transducers. Pressure sensors such as that illustrated in FIG. 1 were used in high temperature areas of the aircraft engine ducting. The reference pressure media is allowable within the differential pressure transducers in this case. The tank filters the high frequency pressure fluctuations such that the reference pressure is quasi-static as measured by the precision transducer and applied internally to the high temperature transducer through the reference pressure lines. If the absolute pressure of 20 psia above were measured as a reference pressure within the tank to a precision of ±0.05%, there would be a ±0.01 psi inaccuracy. If the pressure sensors have a ±2% inaccuracy and a 5 psi range, they contribute a ±psi uncertainty to the combined inaccuracy of the two types of measurements. The maximum uncertainty is now 0.22 psi (±0.11 psi).

Another application exists where the medium is allowable internal to the sensor and frequency discrimination can be used. High temperature microphones usable on rockets, aircraft, and gas turbines are examples. A sensor similar to FIG. 1 is used and a restrictive vent is placed directly in the body of the sensor and the restriction is adjusted such that the frequency response to gas entering and leaving the sensor is low compared with the response of the diaphragm to the acoustic fluctuations that are to be measured.

The most complex problem exists where both high pressures are fluctuating and the media is corrosive and/or detrimental to sensor internals. An example of such an application is the measurement of pressure differences between concentric water/steam tanks in pressurized water reactors. Rapidly changing pressure differences can cause vibrations that may affect the containment of the coolant. The measurement is desirable for both "cause" and "effect" purposes, in that the source of such pressure instabilities, if known, can be isolated and eliminated (cause); or if a failure of the containment should occur, the secondary containments design must be adequate (effect).

DESCRIPTION OF INVENTION

The object of this invention is to provide an improved differential pressure transducer that overcomes the drawbacks of prior art devices and can be useful in the resolving of complex measuring problems. More particularly, the present invention provides a differential pressure transducer that will permit operation at temperatures up to at least 540° C. (1000° F.); will provide operation with both inlet ports exposed to a corrosive atmosphere such as high temperature water, steam or sodium; provides operation at high line pressures and measuring small differential pressures while accommodating high temperatures and/or corrosive atmospheres; provides for the escape of air bubbles when used in liquid applications and provides for small variations of transducer characteristics with changes in temperature or line pressure.

A further object of this invention is to provide new and improved apparatus for measuring a difference in pressure. The apparatus of the present invention provides a pressure difference measurement with accuracy, efficiency, effectiveness and reliability. The apparatus of this invention is of simple structure. The apparatus of the present invention is inexpensive in operation and in manufacture. The apparatus of the present invention functions to provide accurate measurements which are not adversely affected by shock or vibration. The apparatus of the present invention functions to provide accurate measurements regardless of variations in the volume of liquid in the apparatus or in pressure or temperature.

In accordance with the present invention, apparatus for measuring a difference in pressure between sources of pressure comprises a housing. First and second pressure chambers in the housing are each connected to sources of pressure. Third and fourth pressure chambers are positioned respectively within the first and second chambers. A first longitudinally movable flexible wall is provided between the first and second chambers. A second longitudinally movable flexible wall is positioned between the first and third chambers. A third longitudinally movable flexible wall is positioned between the second and fourth chambers. The first flexible wall has one end connected to the housing and the other end is connected to a common movable wall within the housing. The second and third flexible walls have one end connected to the common movable wall. Means to measure the displacement of the common wall as a function of the differential pressure is within the first and second chambers.

The invention according to the present invention further comprises a first pressure chamber having a conduit for coupling to a pipe conducting a medium whose difference in pressure is to be measured. A second chamber has a conduit for coupling to the pipe. A rod is connected to the common movable wall and extends at either end in sealed relation through the housing. One end of the rod is provided with a stop means and the other end of the rod is attached to a target positioned between two coils connected to a bridge sensing circuit. The target is a metallic conductor which modifies the coil impedance as a function of the movement of the rod and the common wall to which the rod is attached.

For a better understanding of the present invention, together with other and further objects thereof, reference is had to the following description taken in connection with the accompanying drawings and its scope will be pointed out in the appended claims.

IN THE DRAWINGS

Figure 1:
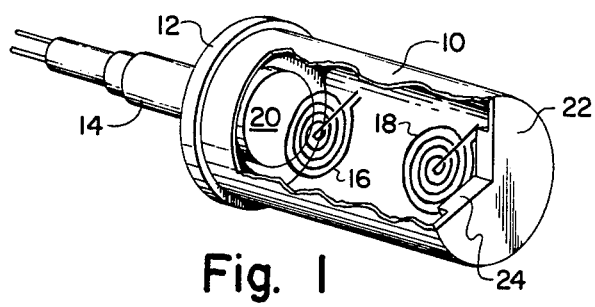
FIG. 1 is a diagrammatic representation of an eddy current transducer with portions broken away to show internal structure.
Figure 2:
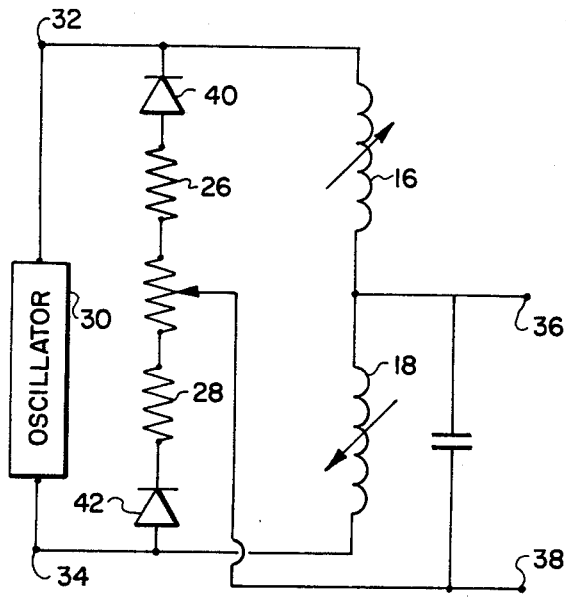
FIG. 2 is a schematic of a bridge circuit that may be used with the transducer of this invention.

The prior art transducer illustrated in FIG. 1 has a cylindrical housing 10 having an opening at one end sealed by a closure 12 through which is connected the electric wiring 14 providing electrical connection to coils 16 and 18. The closure 12 is seen to support a reference element 20 and coil 16 is mounted a predetermined fixed distance from the reference element. The end 22 of the housing opposite closure 12 supports a sensing element 24 and coil 18 is mounted to be positioned a predetermined distance from the sensing element 24. The end 22 however is adapted to flex under the influence of pressure to move the sensing element into and out of the magnetic flux of coil 18 and the sensing element modifies the coil impedance by its presence, the amount being dependent upon the geometry and distance of separation therebetween. The reference element 20 on the other hand is positioned such that it does not change distance from the inactive coil when the transducer is exposed to pressure variation, and serves to provide thermal and radiation compensation. As seen in FIG. 2, coils 16 and 18 form a pair of active elements in an AC bridge and resistive elements 26 and 28 form the passive arms. An oscillator 30 is connected across the bridge input terminals 32 and 34 and when the arm elements 16, 18, 26 and 28 are balanced, the output appearing between terminals 36 and 38 will be zero. When the losses in coils 16 and 18 are varied by the movement of sensing element 22 closer or further from coil 18, this unbalance produces a voltage across terminals 36 and 38 as an output signal. The output voltage in the absence of diodes 40 and 42 is polarity sensitive and will reverse polarity depending on which direction the transducer is unbalanced. The addition of diodes 40 and 42 to the circuit provide for sampling of the bridge unbalance every one-half cycles of the input supply for presentation at output terminals 36, 38 as a DC voltage proportioned to transducer unbalance.

Figure 3:
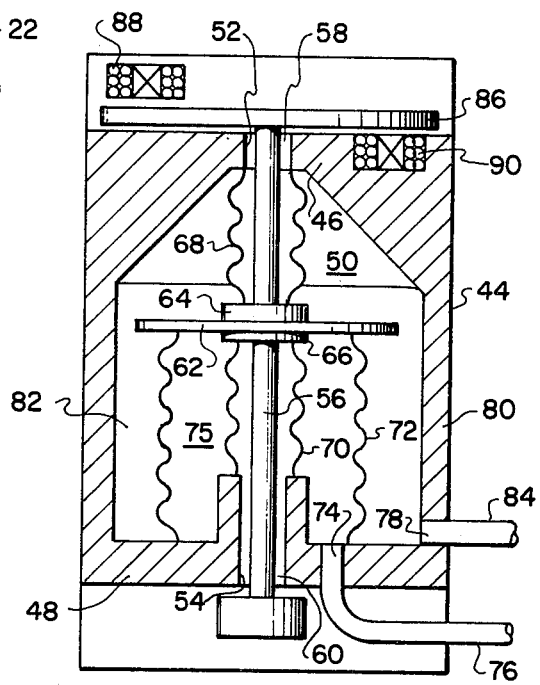
FIG. 3 is a diagrammatic representation of a differential pressure transducer according to the invention.

Referring to FIG. 3, the differential pressure transducer of this invention is illustrated diagrammatically as having a cylindrical housing 44 having ends 46 and 48 with a cavity 50. The housing has an opening 52 in end 46 axially aligned with an opening 54 at the other end 48. A rod 56 is positioned within the axially aligned openings 48 and 50 to extend through the cavity 50 and beyond the ends 46 and 48. A sliding seal 58 and 60 is provided within openings 42 and 54, respectively, to provide a fluid seal between the rod 56 and the housing 44. A circular disc 62 having an opening at the center sized to receive rod 56 is secured thereto in fluid tight relation as by welding and the like. The disc 62 has discs 64 and 66 of smaller diameter secured to either side thereof. A cylindrical bellows 68 is positioned coaxially around the upper part of rod 56 and has the upper end secured in fluid tight relation to the end 46 of housing 44 and the other or lower end of the bellows is connected in sealed relation to disc 64 attached to disc 62 and thus to rod 56. Another cylindrical bellows 70 is positioned coaxially around the lower part of rod 56 with the upper end secured in fluid tight relation to the disc 66 and the other or lower end secured in fluid tight relation to the end 48 of the housing. Another cylindrical bellows 72 of larger diameter is positioned about bellows 70 with one, or the upper, end thereof being secured in sealed relation to the large disc 62 and at the other end secured in sealed relation to end 48 of the housing 44. An opening 74 is provided through end 48 of the housing communicating the chamber 75 defined between bellows 70 and 72. Opening 74 is connected to conduit 76 which is adapted to be connected to a source of fluid pressure. Opening 78 is provided in the side wall 80 of housing 44 communicating the chamber 82 defined between bellows 72 and the cavity 50 within housing 44. Opening 78 is connected to conduit 84 which is adapted to be connected to another source of fluid under pressure.

A target 86 in the form of a large circular disc is attached to an end of rod 56 extending beyond the end 46 of housing 44 to be moved as rod 56 is moved axially. Coils 88 and 90 are secured to the housing 44 on opposite sides of the target 86 and in diametrically opposed relation. At the opposite end of rod 56, a stop 92 is positioned to limit the movement of the rod 56 in one direction while target 86 limits movement in the opposite direction.

Figure 4:
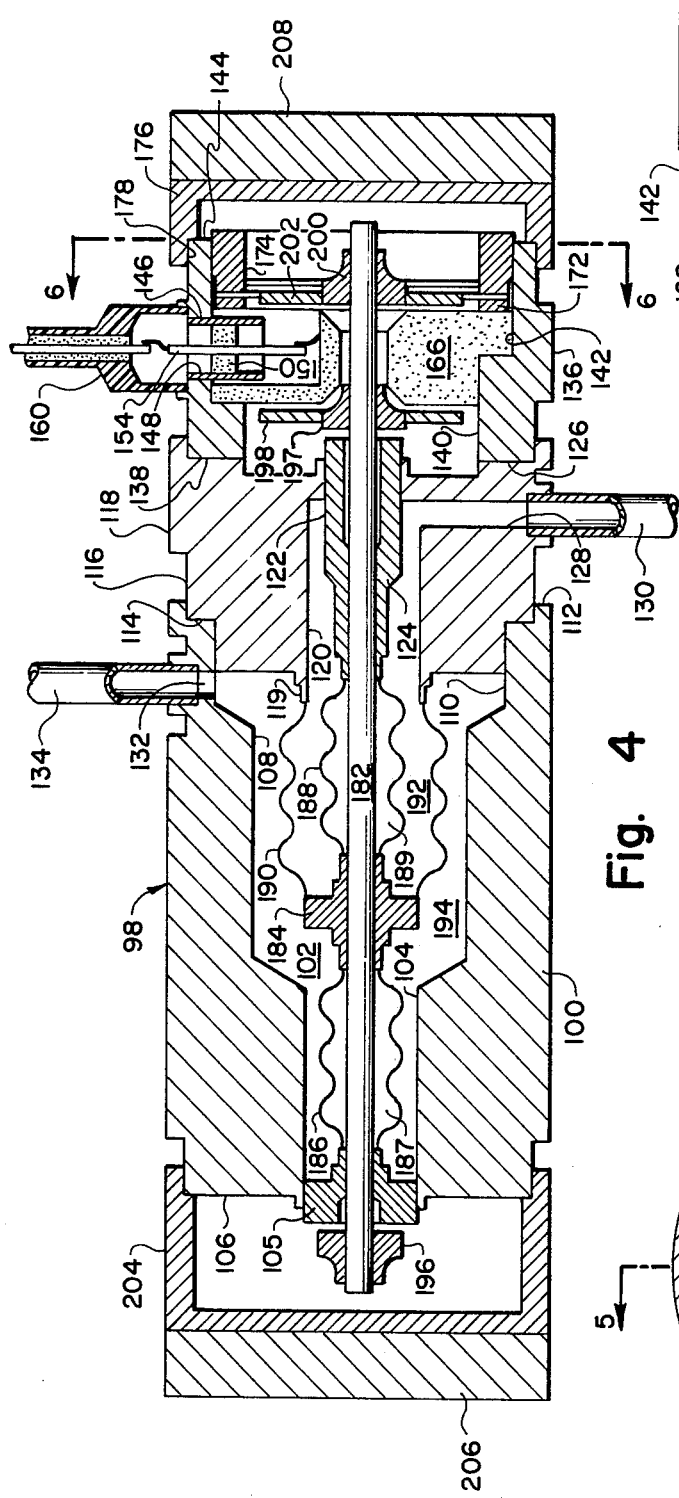
FIG. 4 is a view in cross section of one embodiment of the differential pressure transducer according to this invention.
Figure 5:
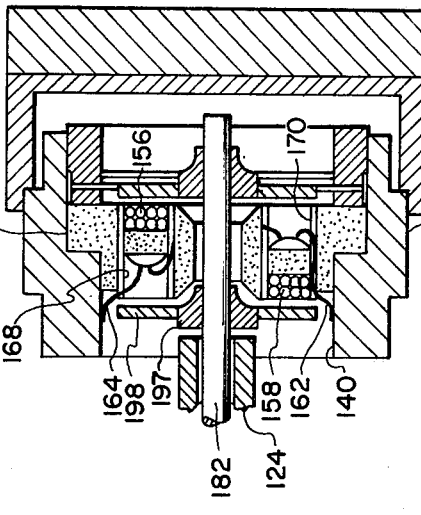
FIG. 5 is a cross sectional view taken along line 5—5 of FIG. 6.
Figure 6:
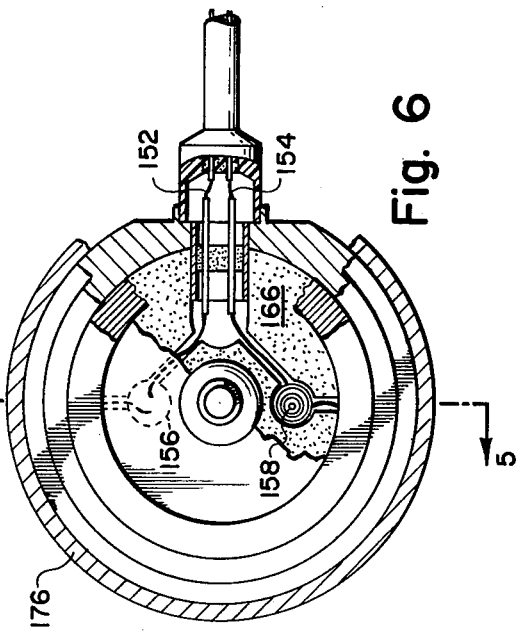
FIG. 6 is a cross sectional view taken along line 6—6 of FIG. 4 and with portions broken away; and, FIG. 7 is a graphical representation of the performance characteristics of the differential pressure transducer at temperatures of 25°, 250° and 400° C.

FIGS. 4, 5 and 6 illustrate the preferred embodiment of the present invention. The transducer 98 is seen to include a first housing member 100 having a central cavity 102 therein comprised of a reduced diameter portion 104 adjacent the end 106 thereof having positioned therein a sliding fluid tight seal, an intermediate diameter portion 108 and a large diameter portion 110 at the opposite end 112. End 112 is provided with a recess 114 of reduced diameter such that the shoulder 116 of housing member 118 is received within the inner diameter of portion 110 of housing 110 and the shoulder 116 provides a stop abutment within recess 114. Housing portions 100 and 118 are secured together in fluid tight relation as by welding and the like, not shown. Housing portion 118 is provided with a central bore 120 while having a bore 122 of reduced diameter at the end opposite shoulder 116. A sliding fluid tight seal 124 is received and secured within bore 122. The end of housing portion 118 opposite recess 114 is provided also with a recess 126 of reduced diameter. Housing portion 118 is provided with an inlet bore 128 through the side wall thereof intersecting bore 120 and is connected to conduit 130 adapted to be connected to a source of fluid under pressure. Housing portion 100 is also provided with a bore 132 through the side wall thereof intersecting large diameter bore 110 and is connected to conduit 134 adapted to be connected to a fluid under pressure.

Housing portion 136 has end 138 of a diameter to be received within recess 126 of housing portion 118 and is secured thereto in fluid tight relation as by welding and the like, not shown. Housing portion 136 houses the electrical parts of the system within a central bore 140 adjacent end 138 and a bore 142 of a larger diameter adjacent the other end 144. A bore 146 is provided in the side wall of portion 136 to intersect the central bore 140. Bore 146 is sized to receive a sleeve 148 supporting a ceramic insulator 150 through which electrical conductors 152 and 154 pass and are connected to one end of coils 156 and 158, respectively. A cable connector 160 of a two wire cable connects through bore 146 to conductors 152 and 154 and to one end of coils 156 and 158. The other ends 162 and 164 of coils 156 and 158 are electrically connected to housing portion 136. The coils 156 and 158 are supported in an annular ceramic coil holder element 166 in axially aligned bores 168 and 170 therein. A thrust spring 172 is positioned thereagainst and an annular sleeve 174 is positioned within the bore 140 to secure spring 172. End cap 176 is provided with a circular recess 178 sized to receive the end 144 of housing portion 136 which is secured thereto by suitable means such as being threadedly connected or by welding and the like, not shown. An end plate 180 is secured to end cap 178 by suitable means and plate 180 serves to provide means for securing the transducer 99 for mounting purposes.

Each of the seal means 105, and 124, is provided with a center bore sized and adapted to receive therethrough a rod 182 in fluid tight sealing relation. The rod is of a length to extend through seal 105 and 124 to a point beyond end 144 of housing portion 136 while extending beyond end 106 of housing portion 100. A sleeve 184 is secured against movement and in fluid tight relation to rod 182 intermediate seals 105 and 124. A bellows 186 is secured in fluid tight relation at one end to sleeve 184 and at the other end to seal 105 to define a closed chamber 187. A bellows 188 essentially identical in size and configuration is secured at one end in fluid tight relation to sleeve 184 and at the other end to seal 124 to define a closed chamber 189. A larger diameter bellows 190 is positioned around bellows 188 in concentric coaxially aligned relation therewith with one end secured in fluid tight sealed relation to the sleeve 184 and at the other end to the end 119 of housing portion 118 to form between bellows 188 and 190 a chamber 192 interconnected with inlet 128 and between bellows 190 and the inner walls of cavity 102 within housing 100, a chamber 194 interconnected with inlet 132.

A stop member 196 is secured to the end portion of rod 182 beyond seal 105 to limit the movement of the rod to the right in FIG. 4. Positioned on and secured to rod 182 intermediate the end of the seal 124 and the coil support housing 166 is a target rim 196 supporting target 198. On the other side of the coil housing, target rim 200 and target 202 are fastened to rod 182 with rim 196 serving to limit movement of the rod to the left to that permitted by the positioning of rim 196 on rod 182 in position to engage the end of seal 124. A cap 204 is secured to the end 106 of housing portion 100 by suitable means and a mounting plate 206 is also secured thereto by suitable means for mounting the transducer. A mounting plate 208 is also suitably secured to cap 176 at the opposite end.

The target 198 is seen to principally act on coil 158 and target 202 on coil 156. The transducer operates such that the large differential bellows 190 deflects only as a result of pressure in chamber 192 differing from that in chamber 194. The two smaller or absolute bellows 186 and 188 are of equivalent size and configuration such that the base or line pressure affects each the same as the other. They further isolate the line pressure media from the motion detecting coils 156 and 158. The equivalence of bellows 186 and 188 compensates for any zero shift that would result from the line pressure changing, the line pressure being defined as:

$$LP = \tfrac{1}{2}(P_A + P_B) \quad (7)$$

where
$P_A$ = absolute pressure in chamber A identified by reference numeral 192, and
$P_B$ = absolute pressure in chamber B identified by reference numeral 194.

The locations of inlets 128 and 132 are such that complete drainage of chambers 192 and 194 is obtained where the transducer is mounted so the axis is vertical and end 106 is uppermost. With the transducer mounted with end 144 uppermost, the sensor can be operated bubble free as is desired for acceptable frequency response where the media is a liquid. The targets are of electrical conductor material that modifies the impedance of coils 156 and 158 by their presence and the coils detect motion of the stop 196 and targets by the eddy current method. The half-wave detection circuitry of FIG. 2 may be used with either a DC output at terminals 36 and 38 where coil 156 is substituted for coil 16 and coil 158 is substituted for coil 18 or an AC output where diodes 40 and 42 are deleted.

The stop 196 limits the axial travel of the shaft 182 if the differential pressure in chamber 194 less the pressure in chamber 192 exceeds the design limits of the transducer. Similarly, the stop 197 limits travel in the opposite direction if the pressure in chamber 192 exceeds that in chamber 194 by an amount greater than the design limit. This design feature permits a full over pressure of either chamber 192 or 194 to be applied without damage as shaft 182 as well as bellows 186, 188 and 190 are designed to withstand these stresses.

The design of the transducer of the present invention has a lower frequency response than a comparable diaphragm transducer due to the mass that moves under pressure. For example, such a unit designed for a ±2 bar differential pressure range and a 90 bar line pressure will have a first resonance at 600 Hz. The same mass will cause the sensor to be sensitive to axial accelerations which will limit the use of this sensor to low shock environments unless special precautions are made.

Figure 7:
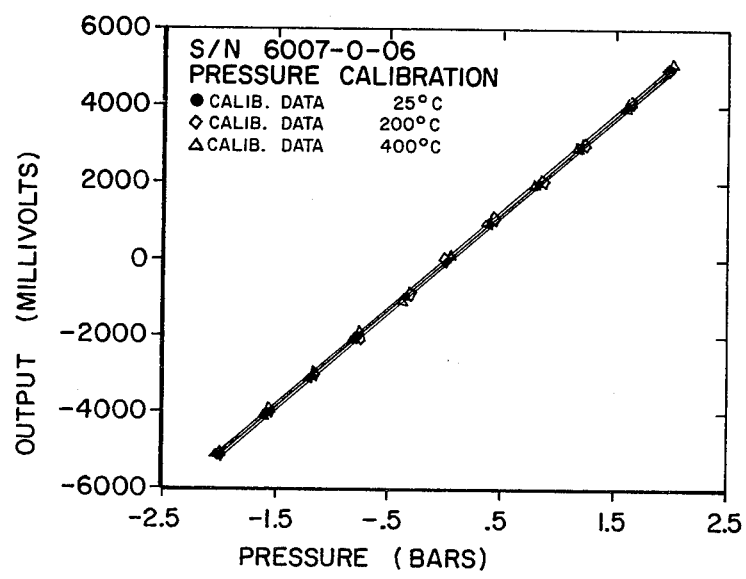

FIG. 7 shows a plot of the pressure calibration and performance characteristics of a typical three bellows transducer according to the present invention at temperatures of 25°, 250° and 400° C. The environment coefficients are tabulated as the mean values with standard deviation for a sampling of ten systems.

TABLE I

| Coefficient | Units | Mean Value | Standard Deviation |
|---|---|---|---|
| Thermal Zero Shift (25°–400° C.) | % FSO/°C. | $2.04 \times 10^{-3}$ | $1.93 \times 10^{-3}$ |
| Thermal Sensitivity Shift (25°–400° C.) | %/°C. | $3.39 \times 10^{-3}$ | $1.91 \times 10^{-3}$ |
| Zero Shift with Line Pressure (1–90 bars) | % FSO/Bar | 0.091 | 0.085 |

Note:
1 bar = $10^5$ Pascal (nt/m$^2$)

The coefficients in Table I were determined by a least squares analysis of discrete data points. These systems are capable of resolving pressure changes of the order of $10^{-3}$ bars and when referred to the 90 bar line pressure, this represents detecting eleven parts per million (11 ppm) at temperatures from ambient to 400° C. by an instrument that can be used to as high as 600° C.

It will be appreciated that the transducer arrangement of this invention can be used in other applications such as a force gauge and the like wherein movement of a target with respect to a coil or other sensing means may be used to detect movement of the target and convert such movement into electrical signals which are a function of the movement and the forces applied.

While there have been described what at present are considered to be the preferred embodiments of this invention, it will be obvious to those skilled in the art that various changes and modifications may be made therein without departing from the invention. It is aimed, therefore, in the appended claims to cover all such changes and modifications which fall within the true spirit and scope of the invention.

What is claimed is:

1. Apparatus for measuring a difference between sources of pressure, comprising:

housing means having ends and side walls;

first and second pressure chambers in said housing means each connected to different sources of pressure;

third and fourth pressure chambers positioned respectively within the first and second chambers and provided with fluid tight sealing means sealing same against communication with said first or second pressure chambers, with the ambient atmosphere or with each other;

a first longitudinally movable flexible wall positioned between the first and second chambers;

a second longitudinally movable flexible wall positioned between the first and third chambers;

a third longitudinally movable flexible wall positioned between the second and fourth chambers;

a movable common wall between said first and second chambers;

said first flexible wall having one end connected to the housing means and the other end connected to the common movable wall within the housing;

said second and third flexible walls each having one end connected to the common movable wall and the other end connected to the housing; and means to measure the displacement of the common wall as a function of the differential pressure within the first and second chambers.

2. The apparatus of claim 1 wherein the housing is provided with a centrally positioned pair of openings, one in each end thereof, a rod means spanning the length of the housing with an end portion of each received for sliding movement within each of the openings, seal means within each opening providing a fluid tight seal between the rod and the housing;

a movable wall member fixedly secured to the rod means intermediate the ends thereof;

the first longitudinally movable flexible wall being attached at one end to the movable wall member and at the other end to one end of the housing in a manner to form interiorly said first chamber and exteriorly between said first longitudinally movable flexible wall and said housing, said second chamber;

the second longitudinally movable flexible wall being attached at one end to the movable wall member and at the other end to said one end of the housing in a manner to form said third chamber isolating said first chamber from said rod seal means; and the third longitudinally movable flexible wall being attached at one end to the movable wall member and at the other end to said other end of the housing in a manner to form said fourth chamber isolating said second chamber from said other rod seal means.

3. The apparatus of claim 2 wherein the first, second and third longitudinally movable flexible walls are of cylindrical configuration with said second and third walls being axially aligned and spaced and said first wall concentrically surrounding said second wall.

4. The apparatus according to claim 1 wherein the third and fourth chambers are substantially equivalent.

5. The apparatus of claim 1 wherein the first, second and third movable flexible walls are cylindrical shaped bellows with the first and second walls being substantially equivalent.

6. The apparatus of claim 2 wherein the means to measure displacement of the common wall comprises at least one vane means attached to said rod exterior of said sealed housing and coil means having characteristics adapted to be modified as a function of the positioning of said vane with respect thereto.

7. The apparatus of claim 6 wherein the vane is an electricity conductive, non-magnetic metal.

8. Apparatus for measuring a difference between sources of pressure, comprising:

a hollow cylindrical housing having ends and a side wall with the ends having aligned openings therein;

an elongated rod means positioned within each end opening for sliding movement and traversing the hollow within the housing;

sealing means within each end opening and surrounding said rod passing therethrough in sliding fluid tight sealing relation with each end;

a disc member secured to the rod means and positioned intermediate the ends of the housing;

a first cylindrical shaped bellows means positioned surrounding a portion of said rod means and said first bellow means secured at one end to an end wall of the housing and said first bellows secured at the other end thereof to one side of the disc member;

a second cylindrical shaped bellows means positioned surrounding another portion of said rod means and said second bellows secured at one end thereof to the other end wall of the housing and said second bellows means secured at the other end thereof to the other side of the disc member;

a third cylindrical shaped bellows means positioned surrounding said second bellows and said bellows secured at one end thereof of the other end wall of the housing and said third bellows means secured at the other end thereof to the other side of the disc member;

an inlet in the housing communicating a first space defined between the second and third bellows connected to a source of pressure;

an inlet in said housing communicating a second space within the housing defined between the housing and the third bellows connected to a source of pressure; and means to measure the displacement of the disc member as a function of the differential pressure within the first and second spaces.

9. The apparatus of claim 8 wherein the first and second bellows means are substantially equivalent.

10. The apparatus of claim 8 wherein the means to measure the displacement of the disc member comprises at least one vane means attached to said rod means exterior of said sealed housing and coil means positioned on said housing having characteristics adapted to be modified as a function of the change in positioning of said vane with respect thereto.

11. The apparatus of claim 10 wherein the vane is an electricity conducting, non-magnetic metal.

12. A method of measuring the pressure differential between two sources of media under pressure which comprises the step of providing a three bellows transducer having two fluid tight sealed absolute bellows of equivalent configuration isolating a motion detecting means from the media, the interior of said absolute bellows being sealed against communication with the media pressures, the ambient atmosphere or each other, subjecting the exterior of each absolute bellows to one of the two media pressures to be measured, connecting a differential bellows to the motion detecting means, applying one of said media pressures to each side of the differential bellows and connecting a means to the motion detecting means to provide an electrical output which is a function of a pressure differential between the two media pressures.

* * * * *